June 9, 1936.  M. P. McCARTY  2,043,386
ELECTROMAGNETIC MOTOR
Filed Dec. 2, 1933  2 Sheets-Sheet 1
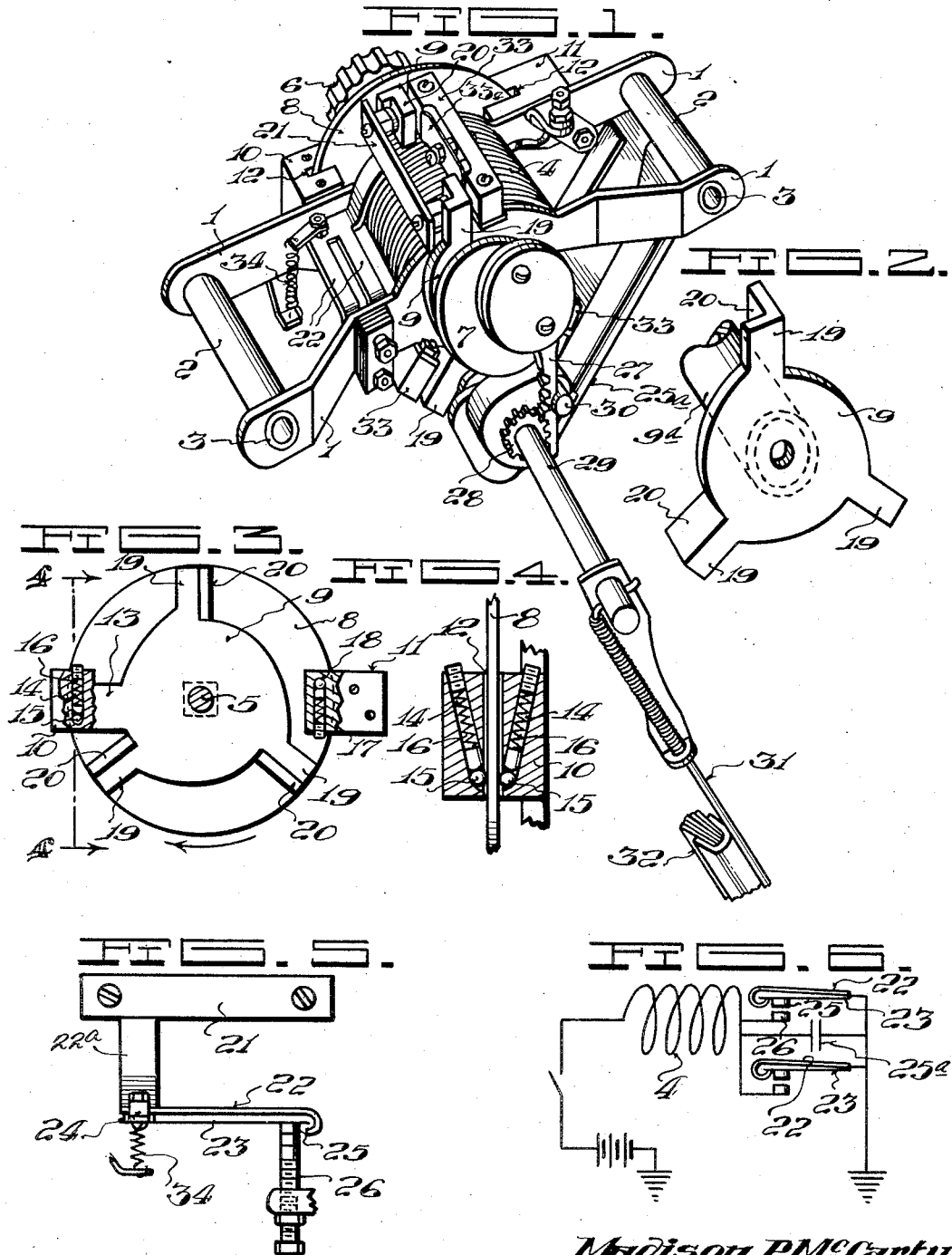

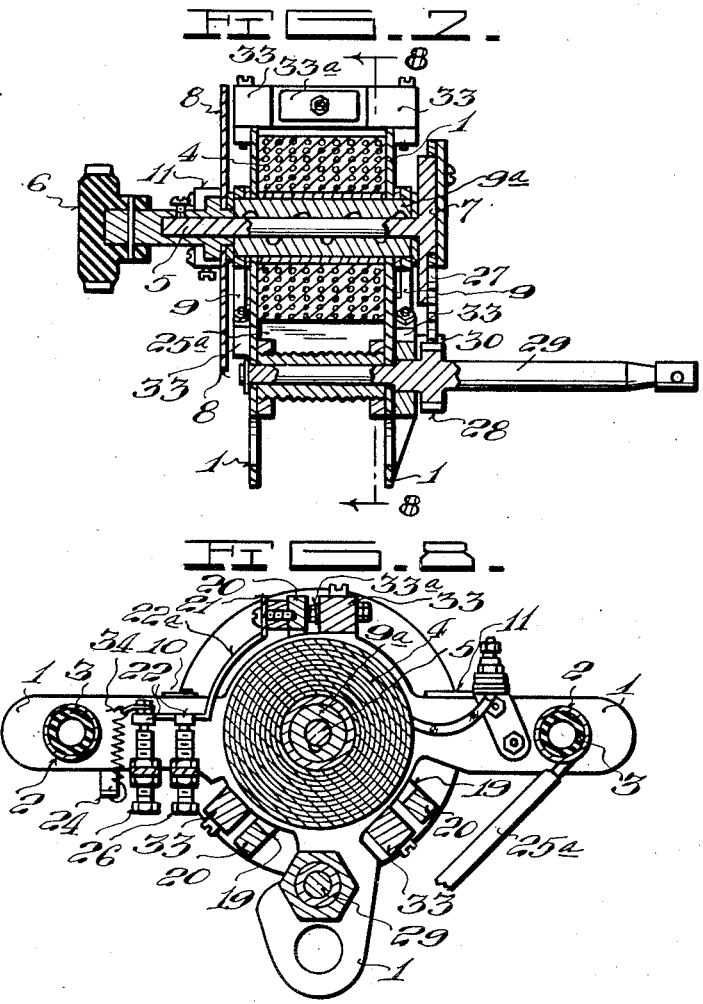

Patented June 9, 1936

2,043,386

UNITED STATES PATENT OFFICE 2,043,386

ELECTROMAGNETIC MOTOR

Madison P. McCarty, Dallas, Tex., assignor of part interest to Warner Clark and B. L. Laird, both of San Francisco, Calif.; Graham B. Moody, Glendale, Calif.; Earl R. Wall, Victoria, Tex.; and Leonard W. Orynski, R. H. Morrison, F. A. Davies, John C. Karcher, and Harry W. Bass, all of Dallas, Tex.

Application December 2, 1933, Serial No. 700,640

4 Claims. (Cl. 172—126)

This invention relates to electrical devices and it has particular reference to new and useful improvements in electric motors.

The principal object of the invention is to provide a simple and inexpensive electrical device for operating windshield wipers and through the medium of which constant and uniform movement is insured under any and all conditions and a reserve power is at all times available.

Another object of the invention is to provide in a motor of the character specified, a novel clutch means for transmitting rotary motion to an operating shaft, combined with means for transmitting rotary motion into oscillating motion to adapt the invention for use as an operating means for automobile and other windshield wipers.

Still another object of the invention is to provide a novel form of electrical contact, two of which are provided to prevent arcing, one being set to break slightly ahead of the companion contact. These contacts are further designed to be self-cleaning so as to insure a positive closing of the circuit at each operation.

Broadly, the invention contemplates an electrical motor, designed for many uses and in which rotary motion is imparted to the armature shaft through a disc clutch by successively subjecting the clutch to a series of progressive impulses at rapidly recurring intervals.

With the foregoing objects as paramount, the invention has particular reference to its salient features of construction and arrangement of parts, which will become manifest as the description proceeds, taken in connection with the accompanying drawings, wherein:—

Figure 1 is a perspective view of a motor constructed according to the present invention as adapted for use for operating a windshield wiper.

Figure 2 is a detail view in perspective of one of the armatures.

Figure 3 is a detail view of one of the armatures and the clutch, with portions broken away.

Figure 4 is a view on lines 4—4 on Figure 3, showing the driving clutch.

Figure 5 is a detail view of the novel type of electrical contacts employed in connection with the motor.

Figure 6 is a wiring diagram of the invention.

Figure 7 is a vertical section taken transversely through the motor, and

Figure 8 is a section on lines 8—8 on Figure 7.

Continuing with a more detailed description of the drawings, 1 designates a frame, the two sections of which are connected together by means of ferrules 2 having hollow insulated cores 3. Mounted between the frame sections is an electro-magnet 4, through which is centrally passed a driving shaft 5. (See Figures 7 and 8.) On one end of the shaft 5 is mounted the clutch disc and a knurled knob 6 while the other end carries a driving disc 7 which is rotated when the shaft is rotated.

The opposite end of the shaft has affixed thereto a disc 8 which functions as a clutch and through which, the shaft 5 is subjected successively to a series of progressive impulses, the intervals of which determine the speed of rotation of the shaft. For example, when the magnet 4 is energized, the disc 8 will rotate to the extent of displacement of the armatures 9 and the disc 8 will be held against reverse movement until the magnet is again energized etc. The armatures are secured together by means of the connecting ferrule 9a of soft iron and through this ferrule the shaft 5 passes as shown in Figures 7 and 8. This ferrule is interiorly grooved as shown for the proper distribution of a lubricating agent.

The holding and driving clutches are comprised of blocks 10 and 11, each having a slot 12 therein. The driving clutch 10, which is the one shown in section in Figure 4 is secured to or integral with the armature 9, it being carried upon the outer end of a projection 13 of the armature. The holding clutch 11 is mounted upon the frame 1. The driving clutch 10 has a pair of diagonal and converging passages 14 opposing the slot 12 therein which emerge near the bottom and within these passages are disposed balls 15, the latter being yieldingly urged against opposing faces of the disc 8 by springs 16. Obviously, when the block 10 is moved upwardly, the balls 15 will have a tendency to grip and move the disc 8 in the direction of the arrow in Figure 3. When the clutch 10 is moved back to its original position for re-engagement with the disc, the balls 15 will be displaced against the resistance of the springs 16 but in order to hold the disc against reversal, a similar arrangement is provided in the block or holding clutch 11, shown in partial section in Figure 3 except that the passages 17 therein converge upwardly in the block and the balls 18 therein serve to grip the disc 8 should there be a tendency for the same to move in a counter-clockwise direction.

The armatures 9 disposed on either end of the electro-magnet 4 are substantially the same in construction except that one of these armatures carries the driving clutch 10. This latter armature is illustrated in Figure 3 while the companion armature is illustrated in Figure 2. It will be noted that each of the armatures 9 is provided with radially extended arms 19, each arm being provided with a projection 20 adapted to slightly overreach the ends of the magnet 4 and has a comparatively large pole face area as shown. A contact carrying member 21, composed of non-ferrous material is affixed jointly to the upwardly extending projections 20 of the armatures 9 and is so shaped as to suspend the contacts adjacent one side of the magnet 4 between the sections of the frame 1, as apparent in Figure 1.

The novel type of electrical contact is shown in Figure 5 in detail and is comprised of the member 22, connected by means of the curved strip 22a to the member 21 and bifurcated to provide a mounting for the two contact points. The actual contact member is comprised of a bronze leaf member 23, shown in Figures 5 and 6, whose free end extends under the hooked end of the member 22. The leaf member 23 is secured at 24 and on its opposite end is mounted a contact point 25 which engages the contact point on the end of a screw 26.

The purpose of the two pairs of contact points is to eliminate or reduce the objectionable effects of arcing, which frequently results in sticking of the contact points. The two leaf members 23 are so adjusted that one of them will break slightly ahead of the other and the latter contact will carry the operating current, thus insuring a positive contact at all times.

It is also pointed out that the particular type of contact shown will be self-cleaning due to the rubbing action one upon the other and there will be little trouble from accumulations of foreign matter on the points.

In order to transform the rotary motion of the shaft 5 into a reciprocating or oscillatory movement an arm or gear rack 27 is eccentrically secured to the disc 7. The teeth of the same are engaged with a pinon 28 carried by the shaft 29, which extends outwardly in parallel relationship with the rotating axis of the shaft 5. A roller or stop 30 holds the gear rack 27 in operative relationship with the pinion 28. Thus it will be seen that as the shaft 5 is rotated, the gear rack 27 is reciprocated which in turn oscillates the extended shaft 29.

The motor shown is primarily designed as an actuating means for a windshield wiper. The wiper arm 31 and wiper 32 are secured to the outer end of the shaft 29 in the conventional manner.

In operation, the points 25 are held normally closed and the armatures are held normally out of engagement with the pole pieces 33 by the spring 34. When current is supplied to energize the magnet 4, the armatures 9 are attracted to the pole pieces 33, of which there are three pairs, each pair being companion to the three projecting arms 19 of the armatures. When the armatures are thus moved, the clutch 10 grips the disc 8, advancing the same in a clockwise direction by virtue of the gripping tendency of the balls 15. When the armatures are attracted to the pole pieces, the circuit is broken at the points 25 since the member 21, in being fixed to the armature, is moved and through the connecting strip 22a, the leaf member 23 is lifted by the hooked end of the member 22, thereby leaving the armatures to the influence of the spring 34. However, as the armatures are again returned to normal position after having been displaced by the magnet 4, the disc 8 is prevented from following the reversing movement of the armatures by the holding clutch 11, which opposes the driving clutch 10, the balls 18 therein gripping the sides of the disc, securely holding the same. The pole pieces 33 each have a "bumper" 33a recessed therein and against which the armatures impinge to relieve the vibration and reduce the hum which would otherwise be caused by contact of the armatures with the pole pieces.

A condenser 25a of conventional design is optionally mounted across the points to reduce arcing at the points.

From the foregoing it is apparent that energization of the magnet 4 as rapidly recurring intervals will progressively move the disc 8 by virtue of the relationship of the clutches 10 and 11 therewith, to impart rotation to the shaft 5, the speed of which is dependent upon the degree of displacement of the armatures 9. It is also apparent that a more uniform and constant movement is provided and a greater reserve of power is had in the case of the application of the motor to operate a windshield wiper than in operating the same by vacuum as is done more or less conventionally.

Manifestly, the construction shown is capable of some modification and such modification as is considered within the scope and meaning of the appended claims is also considered within the spirit and intent of the invention.

What is claimed is:

1. In an electric motor, an electro-magnet, a rotatable shaft, armature means actuated by the magnetic action of said electro-magnet, a disc mounted on said shaft, means operated by said armature means for imparting rotation to said disc, said means comprising clutch members, bifurcated to embrace the edge of said disc in diametrically opposed relationship, each of said clutch members having in their bifurcated portions opposed, angular bores converging toward the sides of said disc and containing spring pressed balls, said balls being arranged to frictionally engage and cause movement of said disc with a series of rapid, successive impulses when said armature means is actuated.

2. In an electric motor, an electro-magnet, pole pieces stationary with and grouped about said magnet, armature means attracted by said pole pieces upon energization of said magnet, a shaft extending axially through said magnet, a disc fixedly mounted thereon, clutch means carried by said armature means, said clutch means comprising members slotted to receive the edge of said disc, the portions of said members divided by said slots having angular bores converging toward the sides of said disc and containing balls, said balls being arranged to engage said disc on either side and effect advancement of the same in one direction when said armature means is actuated.

3. In an electric motor, an electro-magnet and a shaft passing freely through its axis, pole pieces mounted adjacent to said magnet, armature means mounted for movement by said pole pieces, a rotatable disc affixed to said shaft, means carried by said armature means for transmitting rotation to said disc by imparting thereto rapidly recurring impulses, said means comprising members arranged in diametrically opposed relationship and containing means movable against and away from the sides of said disc when said armature means is actuated.

4. In an electric motor, an electromagnet, an operating shaft extending axially therethrough, pole pieces carried by said magnet, armature means mounted adjacent to and actuated by said pole pieces upon intermittent energization of said magnet, a disc fixedly mounted on said shaft, clutch means actuated by said armature means for transmitting rotation to said disc, said clutch means comprising members slotted to embrace the edge of said disc, one of the members having bores at angles to converge toward the sides of said disc, the other of said members having bores inversely disposed relative to said first bores, balls disposed in said bores and engageable with the sides of said disc for effecting movement thereof in successive impulses during movement of said armature means toward and away from said pole pieces.

MADISON P. McCARTY.